United States Patent

Azure, Jr.

[15] 3,643,348
[45] Feb. 22, 1972

[54] SYSTEM AND METHOD FOR INDIVIDUALLY PROGRAMMED AUTOMATIC TEST GRADING AND SCORING

[72] Inventor: Leo L. Azure, Jr., Richland, Wash.
[73] Assignee: Automata Corporation, Richland, Wash.
[22] Filed: Aug. 18, 1969
[21] Appl. No.: 850,856

[52] U.S. Cl. ........................................35/48 B, 235/61.6 E
[51] Int. Cl. ..............................................G09b 7/00
[58] Field of Search ..................35/48, 48 A, 48 B, 8 R, 9 R, 35/9 A, 9 B; 235/61.603, 61.7

[56] References Cited

UNITED STATES PATENTS

| | | | |
|---|---|---|---|
| 3,050,248 | 8/1962 | Lindquist | 35/48 B X |
| 3,122,844 | 3/1964 | Karash et al. | 35/9 B |
| 3,221,418 | 12/1965 | Hoernes | 35/48 B X |
| 3,267,258 | 8/1966 | Bene | 35/48 B X |
| 3,540,138 | 11/1970 | Ingeneri | 35/48 B |
| 3,541,698 | 11/1970 | Cole | 35/8 R |
| 2,656,619 | 10/1953 | Thurstone et al. | 35/48 A |

Primary Examiner—Wm. H. Grieb
Attorney—Brufsky and Staas

[57] ABSTRACT

Test cards include a group of answer indication areas corresponding to the multiple choice answers for each of a plurality of problems for receiving indicia indicating answer responses to the problems. Correct answer information coded on the card identifies predetermined answer indication areas as corresponding to the correct answers for each problem. Sensing of the correct answer code from each test card automatically programs the apparatus with the correct answer for the problems for comparison with the sensed answer response indicia for grading and scoring the answer responses to the plurality of problems of each test card. A visible correct answer code of plural bit positions includes a number of code bit permutations for identification of each of the answer indication areas as a correct answer to prevent deciphering of the correct answer code. Automatic system control and recording of grading and scoring results is provided.

24 Claims, 5 Drawing Figures

INVENTOR
LEO L. AZURE, JR.

BY Brufsky and Staas

ATTORNEYS

INVENTOR
LEO L. AZURE, JR.

BY Brufsky and Staas
ATTORNEYS

SYSTEM AND METHOD FOR INDIVIDUALLY PROGRAMMED AUTOMATIC TEST GRADING AND SCORING

BACKGROUND OF THE INVENTION

1. Field of the Invention

This invention relates to a method and system for automatically grading and scoring answer responses to problems of the multiple choice type, and more particularly, to such a method and system providing individual and automatic self-programming of the grading and scoring operations.

2. State of the Prior Art

Systems for automatically grading and scoring responses, or answer choices, to problems of the multiple choice answer type are well known in the prior art. One such prior art system is set forth in U.S. Pat. No. 3,284,929 of Leo L. Azure, Jr., entitled "Test Grading Machine" and assigned to the assignee of the present invention.

In such prior art grading and scoring systems, there is typically provided a test card, or answer document having a format comprising groups of answer indication areas arranged in rows and corresponding to the multiple choice answer selections for a plurality of problems. Answer indicia are applied to the answer indication areas by the user of the test card, such as a student, to indicate answer responses to the problems. Such test cards, bearing the answer response indicia, are automatically processed by the test grading and scoring system for grading and scoring the answer responses represented by the answer indicia for the plurality of problems.

The grading and scoring operation requires that the system first be programmed with the correct answers to the problems for which answer responses are provided on a given set of test cards. In prior art systems, the correct answer information typically is provided by a master storage means which is initially programmed with the correct answers to a given set of problems, such as in a test to which a large number of test cards relate, and with which master information the information sensed from each of the test cards is compared.

The master answer storage means may have a format similar to that of the test cards, defining columns and rows of answer indication areas in which indicia are applied by the instructor, for example, for identifying the correct answers to the problems. In the system of the referenced patent, a matrix plugboard arrangement of master answer storage is provided in the apparatus. Alternatively, a master card having a format similar to the test cards may be employed, to which correct answer indicia are applied, and which is physically inserted into the grading apparatus. The master answer storage means is then scanned in synchronized relationship with the scanning of successive ones of the plurality of test cards for grading the answer responses on each of the successive test cards. In other systems, the master answer storage means may comprise a memory of electronic or magnetic type, into which the correct answers are entered, such as by sensing and transfer from a master card.

The system of the referenced patent is available for use in individual schools, affording the benefit that the score results for examinations are available almost immediately following completion of the examination. Thus, the system serves as both a teaching tool and a learning tool for the examinees. The system of the referenced patent is particularly desirable in that it does not require constant attendance by an operator, and provides for automatically and rapidly grading and scoring a large number of test cards.

Systems of the prior art, as described above, however, are primarily useful when at least several and preferably a large number of test cards all relating to the same examination, and thus the same set of problems, are to be scored in a simultaneous scoring sequence as a group. This results from the requirement that the scoring apparatus be initially manually programmed, with master answer information for each different test.

As is now well recognized, the most effective teaching techniques, and those most beneficial to the learning process, require that each student be permitted to progress at his own rate. The determination of the progress of each student, however, requires that some form of testing, or inventory taking, be periodically performed to gauge the progress of each student, and preferably that it be done on an almost daily basis. In any given class of students, there exists a wide range of different levels of progress of the individual students. Effective testing of a large number of students at different progress levels requires the use of a corresponding number of tests of different levels of difficulty. The problem is further compounded by the usual requirement that different tests be provided for different subjects. Schedules of tests directed to these purposes are presently commercially available.

Grading and scoring of such tests, however, is very time consuming and difficult, presenting an onerous task for the instructors and being very wasteful of their time. Further, recording the results of the grading and scoring of each such test is very time consuming and difficult. Test scoring machines of the described prior art type do not satisfy the requirements for testing such a range of different progress levels in a class of students. This results, since the prior art test scoring machines must be manually reprogrammed for each different test, and thus for each different student progress level, rendering such prior art apparatus both time consuming to use, and inefficient in operation. In addition, prior art systems fail to provide effective and efficient means for recording the testing results, particularly where testing at different progress levels is to be performed.

SUMMARY OF THE INVENTION

These and other defects and inadequacies of prior art test grading and scoring systems and methods are overcome by the apparatus and method of the invention. In accordance with the test grading and scoring system and method of the invention, a test card for receiving indicia representing answer responses to problems of the multiple choice type includes a code which predetermines and identifies the correct answer for each problem. The code is sensed and decoded by the scoring and grading apparatus of the system in timed relationship to the sensing of the answer response indicia to provide automatic self-programming of the grading operation of the apparatus by each test card.

In a preferred embodiment, each test card includes a group of answer indication areas corresponding to the multiple choice answers for each of a plurality of problems, to which areas indicia are selectively applied to identify answer responses, or answer choices, to the problems. The groups of answer indication areas preferably are arranged in rows corresponding to each of the plurality of problems, with the corresponding answer indication areas of successive rows aligned in vertical columns.

The coding on each test card identifies a given answer indication area of each group thereof as the correct answer for the corresponding problem. The terms code and coding are to be understood to include both the set of rules by which the data, i.e., the correct answer information, is converted from one representation to another, and also the set of representations defined by the set of rules selected, as the context may require. Thus, the code may be provided in any form adapted for automatic processing, both as to the sensing of the code representations and the decoding operations. Preferably, the code is provided, or recorded on each test card in a representation adapted for optical scanning and for example may include visible or invisible code indicia. Magnetic and other forms of recording of the code representations may also be employed.

In a preferred embodiment, a plural bit position code is employed. Each test card includes a group of code bit positions, for receiving code bit indicia, and corresponding to each group of answer indication areas. The code bit indicia are provided in each group of code bit positions in accordance with any of various permutations which, as defined by the code, identify a particular answer indication area of the respective associated group thereof as the correct answer for the corresponding problem.

Preferably, corresponding bit positions of the plurality of rows are aligned in vertical columns. Further, the bit indicia may simply comprise preprinted, visible marks in the appropriate positions, adapted for optical sensing. The aligned arrangement of the answer indication areas and the code bit positions facilitates the time-synchronized sequential scanning of the corresponding rows of code bit positions and rows of answer indication areas which are respectively associated with the numbered problems.

A code having a relatively small number of bit positions affords a relatively large number of code bit permutations each of which is available to identify a corresponding one of the answer indication areas as a correct answer. On any given card, therefore, for all, or substantially all problems having a given answer indication area as the correct answer response, different code bit permutations may be provided, rendering detection of the code by the card user virtually impossible. In addition, different sets of cards having different arrangements of code bit permutations may be provided wherein the different code bit permutations nevertheless identify the identical answer indication areas for the same numbered groups of answer indication areas. Such different sets of cards are useful for different groups of students taking the identical examination at different times. In any case, each student taking an examination is provided with a test card on which to provide answer choice indications, wherein that test card is suitably coded in advance of use thereof by the student, to identify the predetermined correct answers to the problems of that examination.

The apparatus of the invention for grading and scoring the self-programming test cards of the type in accordance with the invention comprises means for receiving a plurality of test cards and for advancing the cards therethrough individually, in succession. There is provided a sensing station having first means for sensing the code bit indicia identifying predetermined correct answers and second means for sensing the answer indicia provided on the test card in time synchronized, sequential relationship for the plurality of problems on each card as the card is advanced therethrough. Decoding means respond to the code bit indicia sensing means to identify the correct answer indication area represented by each group of code bit indicia, in succession. Since each card individually and automatically programs the apparatus with the correct answer information the successive cards need have no relationship as to the predetermined correct answers for the problems thereon.

Synchronization control and logic comparison circuits provide for comparison of the sensed and decoded correct answer code bits and the corresponding, sensed answer choice indicia for the plurality of problems, individually and in succession, to determine whether the answer responses are correct or incorrect. Upon completion of the grading operation, printing counters which accumulate, for example, the number of right and/or the number of wrong answer responses on each test card may be actuated automatically to print the total scores thus accumulated on the test card.

In accordance with one embodiment of the invention, a system control and output recording system includes a typewriter suitably interfaced with the grading and scoring apparatus for providing general system control of the operation thereof, and for responding to the grading and scoring operations thereof to automatically record the grading and scoring results in a permanent compilation for an entire group of cards, such as those corresponding to a group of students. In such an embodiment, an individual test card may be inserted into the apparatus and the typewriter actuated, such as by typing on a keyboard thereof, to enter the test card user's name or other identification on a suitable recording form in the typewriter. The typewriter may then initiate the processing of the test card through the grading and scoring apparatus and respond to the operations thereof to provide a problem by problem identification of correct and incorrect answers and the particular answer given for each incorrect answer, the total number of correct and similar such information.

DETAILED DESCRIPTION OF THE INVENTION

Figures 1, 2, 3:
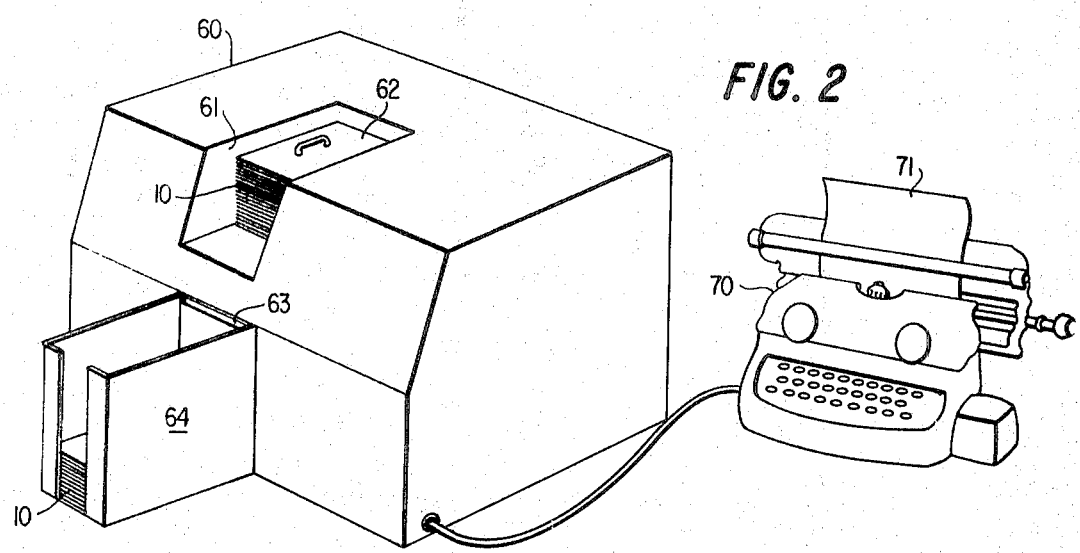
FIG. 1 shows, in partial portion, a test card in accordance with the invention.
FIG. 2 is a perspective view of the test grading and scoring apparatus and the system control and output recording means of the system of the invention.
FIG. 3 is a portion of a record sheet prepared by the output recording means of the invention.

In FIG. 1 is shown a self-programming test card 10 in accordance with the invention. The card 10 includes a plurality of rows or groups of answer indication areas, numbered 1 to 50 to correspond to similarly numbered problems, each of the rows including a plurality of areas A through E corresponding to multiple choice answers to correspondingly numbered problems. Preferably, the group of answer indication areas A to E in each row for the plurality of rows are aligned in vertical columns.

In the embodiment of the test card 10 shown in FIG. 1, the code for identification of the predetermined one of the answer indication areas corresponding to the correct answer for each of the problems is provided in a six-code bit position format, with the group of six code bit positions for a given problem aligned in a horizontal row and with the corresponding bit positions for the plurality of groups aligned in vertical columns.

Referring more specifically to the test card 10, the six-bit position code is provided in the bracketed region identified by numeral 20 wherein the individual bit positions are identified by the letters $a$ through $f$. There optionally may be provided a column of timing marks 30, the centerline of each timing mark being aligned with the centerlines of the bit positions in corresponding rows. For a purpose to be described, the rows of code bit positions are longitudinally displaced on the card 10 with respect to the corresponding rows of answer indication areas for the problems. For example, row $1a$ comprising the first group of code bit positions and the corresponding row of answer indication areas for problem 1 are longitudinally offset. Thus, all of the groups, or rows, of code bit positions $1a$, $2a$ . . . and $50a$ are offset from the corresponding answer indication area rows 1, 2 . . . and 50, respectively, by equal amounts.

The code bit indicia are represented in FIG. 1 as darkened areas such as 21, 22, etc. In one embodiment, these indicia may be provided by printing in dark ink on a card 10 of light background for detection by optical sensing. As explained more fully hereinafter, a six-bit position code provides a total of 64 permutations which are available to identify individual ones of the five columns of answer indication areas A through E. Thus, a total of 12 different code bit permutations may be employed to identify any given one of the indication areas A to E, with four code bit permutations unused. The number of code bit positions, of course, may be increased or decreased in accordance with the desired coding complexity to avoid deciphering of the code by a student taking the examination.

Even the relatively small number of six-bit positions, however, is more than ample to avoid deciphering of the code by a student taking the examination. In addition, the offset relationship of the bit position rows and the corresponding answer indication area rows enables the provision of dummy bit position rows x, y, and z which thus serve to render the code even more difficult to decipher. Thus, code bit indicia such as 23 and 24 in the row x may be applied to the card 10 to create a further impediment to any unauthorized attempt to decipher the code. In the alternative, the code bit indicia may be printed in magnetic ink on a black background area of the card 10 so that they are not visible to the student. As a further alternative, a magnetic recording tape may be provided on the card 10 for recording the correct answer code in an obviously invisible manner.

The card 10 may further include a portion, such as in the upper section, for entering a test number, the score, and the student's name, the date of the examination and similar information in accordance with conventional card formats. Typically, all entries except the score will be made manually by the student using a given card 10. The score, or results of grading the examination, may be printed automatically in the score area of the card 10 by the apparatus of the invention. Such printing techniques are well known in the art, as disclosed in the above-referenced patent.

In FIG. 2 is shown a perspective view of test grading and scoring apparatus 60 and a system control and output recording means 70, in accordance with the invention. The system control and output recording system 70 is represented by a typewriter, and is described more fully hereinafter. The apparatus of the invention may be utilized either in an automatic sequence mode for scoring a plurality of cards or in a controlled mode for scoring individual cards, in a manner to be described. When used in the automatic mode, a plurality of test cards 10 are inserted into a hopper 61 of the apparatus 60 and are held in place by a suitable weight 62 for enabling successive feeding of individual cards into the apparatus for processing in accordance with the scoring and grading operations. The scored and graded test cards are exhausted through an exhaust slot 63 and received in a receiving hopper 64, as indicated by the group of stacked test cards 10 contained therein.

The typewriter 70 is electrically connected to the apparatus 60 and may comprise any suitable signal generating keyboard instrument which, by suitable interface circuits, may communicate with the apparatus 60 as a source of control signals or may respond to signals generated by the apparatus 60 for output recording purposes.

The function of the typewriter 70 in FIG. 2 may best be understood with reference to FIG. 3 wherein is shown in greater detail a record sheet 71 of the type inserted in the typewriter 70 in FIG. 2. In accordance with the controlled mode of operation of the system of the invention, wherein individual test cards are graded and scored, a student may insert a card 10 into the hopper 61 and then type his name and, for example, a test number for identification of the test on the record sheet 71, in the positions provided therefor. The sheet 71 also includes numbered columns 1 through 50 corresponding to the problem numbering on the test card 10 and a score column.

Upon entry of the test number, for example, or by other suitable key actuation, the typewriter 70 causes the apparatus 60 to proceed with the scoring and grading of the student card entered therein, and now serves as an output recording instrument responsive to the grading operations. For example, the grading of successive problems causes the typewriter carriage to advance in measured, successive steps to print positions aligned with the correspondingly numbered columns on the sheet 71. For each correctly answered problem, a blank or other indication, such as a dot may be provided. Where multiple answer indication areas are marked, a notation such as M, indicated in column 2, may be provided. By contrast, where incorrect answers are provided, the identification of the incorrect answer indication area may automatically be entered as represented by the notations B and A in the columns 3 and 50 on the sheet 71. Finally, a total score accumulated by the apparatus 60 and, if desired, printed on the test card 10 may also be transmitted to the typewriter 70 to effect print out of that score in the score column of the sheet 71. Each student taking the test would proceed in this manner to enter his card for grading and to type his name on the record sheet 71, whereby an automatic compilation of the test results, and thus an inventory of the entire group of students is automatically provided.

In the automatic sequence mode of operation, suitable coding may be provided on each card to be sensed by the apparatus 60 and cause an entry of the card identification on the record sheet 71, with the scoring results thereupon being entered in the manner described, in sequence for each of a plurality of cards placed in the hopper 61.

Figure 4:
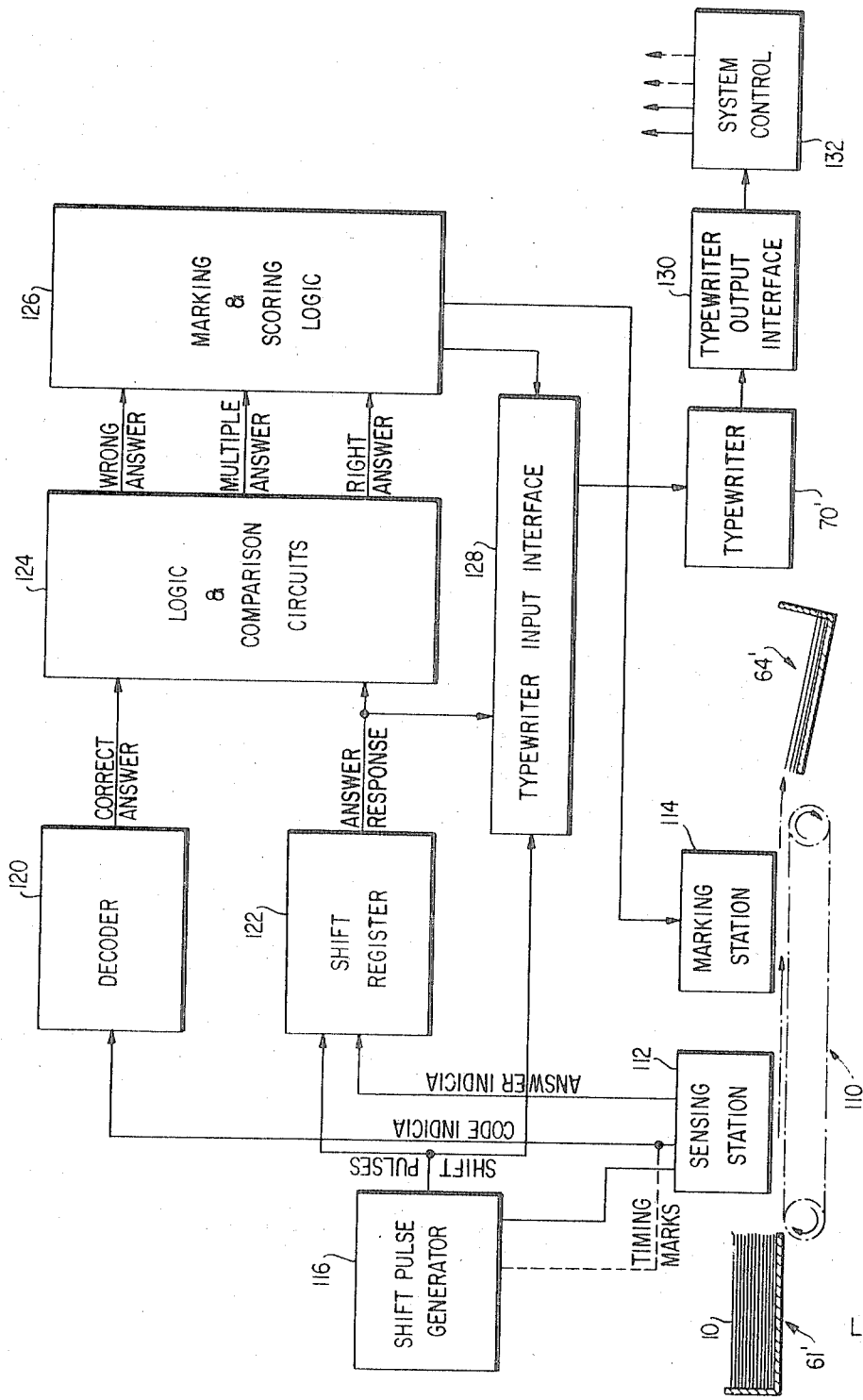
FIG. 4 is a block diagram of the system of the invention.

In FIG. 4 is shown a simplified block diagram comprising the basic component subsystems of the test scoring and grading apparatus and the system control and output recording means of the system of the invention, as shown and discussed with reference to FIG. 2. The cards 10 are positioned in a hopper 61' for successive engagement and advancement by a card transport means 110 through the apparatus for the grading and scoring operations, and exhaust to the receiving hopper 64'. Any suitable transport means may be provided, and are well known in the art.

The cards are transported in succession past a sensing station 112 and a marking station 114. The sensing station 112 includes means for individually sensing the bit positions $a$ through $f$ of the columns 20, for individually sensing the columns A through E of answer indication areas of the test cards 10, and for sensing the column 30 of timing marks, as the cards are successively advanced therethrough. Preferably, the sensing is performed sequentially for the successive timing marks, rows of answer indication areas, and rows, or groups, of the bit positions of the code 20. For a test card 10 of the type shown in FIG. 1, having code bit indicia adapted for optical sensing, both of the code and answer indicia sensing means and the timing mark sensing means of the station 112 may comprise suitable illumination sources and photocell sensing devices. Where magnetic or other types of code indicia or other types of answer indicia or timing marks are employed, corresponding, compatible types of sensing means are provided.

The cards are successively advanced past the sensing and marking stations 112 and 114 by the transport means 110 in the direction of the arrow, with the top edge of the card 10 leading, and at a constant rate. The displacement of the stations 112 and 114 facilitates the positioning of the sensing and marking means and assures that the respective operations thereof do not interfere. The marking station 114 may include, for example, marking devices for error marking the test card 10 to indicate incorrect answers and to mark the correct answer indication area for each problem answered incorrectly. A system for effecting such correct answer marking is disclosed in the above-referenced patent. The error marking may comprise an edge marking technique wherein the marking station 114 imprints a mark immediately adjacent a longitudinal edge of the card 10 and aligned with the row of answer indication areas corresponding to the incorrectly answered problem. An edge mark technique of this type is disclosed in the copending application entitled "Test Grading and Marking Method and Apparatus", Ser. No. 621,275 of Hassfurther and Gates, filed Mar. 7, 1967, now U.S. Pat. No. 3,487,560, and assigned to the assignee of the present invention. The marking station 114 may also include a score printing means, such as an accumulating printing counter for printing the score on the test card prior to exhaust to the exhaust hopper 64'.

The sensed code bit indicia output of sensing station 112 is applied to a decoder circuit 120 and the sensed answer indicia output of the station 112 is applied to a shift register 122. The shift register 122, as described more fully hereinafter, includes a number of stages equal to the number of rows by which the corresponding answer indication area of rows and corresponding code bit position rows are displaced or offset, as above discussed.

The information stored in the shift register 122 is advanced therethrough in a sequential, stepped manner in response to the detection of successive timing marks. The advancement may be accomplished in accordance with successive shift pulses generated by shift pulse generator 116 in response to detection of the successive timing marks of column 30. As discussed more fully hereinafter, the provision of the column of timing marks 30 is optional, and these marks may be identical in appearance to the code bit indicia, if desired. Particularly, regardless of the number of bit positions in the code employed, only a single code bit permutation exists in which no indicia is applied to at least one bit position. By not employing that permutation, at least one bit position indicia is provided in each row. Thus, the bit position indicia may serve a dual function in detection for generating shift pulses. Alternatively, the provision of the column of timing marks 30 provides a further confusing factor for preventing deciphering of a visible code presented on a test card, while retaining the use of the bit permutation having no code bit indicia. In a system employing the code bit indicia for the generation of the shift pulses, a logic OR gate having six inputs corresponding to the six bit positions may be included in the shift pulse generator 116 for responding to the sensed code bit indicia and generating the shift pulses.

In either case, the shift pulses cause the answer indicia applied to the shift register 122 to advance through the successive stages thereof at a rate corresponding to the successive shift pulses and thus to the successive sensing of rows of answer indication areas. The number of stages in the shift register 122 and the rate of advancement of the information from the input to the output stages thereof is determined in accordance with the physical displacement of the sensing and marking stations 112 and 114 and the rate of the test cards by the transport 110. Due to the synchronized operating relationship of these components, the sensed answer indicia from a given row of answer indication areas is presented at the output stage of the shift register 122 simultaneously with the presentation of that same row of answer indication areas in position at the marking station 114 for receiving marking thereon in accordance with the above-described marking operations. In addition, the number of stages of shift register 122 is related, as above described, to the offset of the rows of corresponding code bit positions and answer indication areas on the test card 10. Thus, during the shift interval in which a signal representing the sensed answer indicia for a given problem is presented at the output stage of the shift register 122, the code bit indicia identifying the correct answer to that same problem is sensed by the sensing station 112 and applied to the decoder 120, which substantially instantaneously decodes the code bit permutation thus presented to produce a correct answer output.

Thus, during each interval in which the answer response to a given problem is presented at the output stage of shift register 122 and thus to the input of the logic and comparison circuits 124, the correct answer for that same problem is presented at the output of decoder 120 and thus to the logic and comparison circuits 124. The circuits 124 compare the answer responses and the correct answer to determine correspondence therebetween, and particularly to determine whether the indicated answer response is either right or wrong for that problem. The circuits 124 may also recognize the existence of multiple answers which then may be separately processed as distinguished from wrong answers and right answers, or which may be processed as wrong answers, as desired.

The outputs from logic and comparison circuits 124 are applied to a marking and scoring logic system 126. The system 126 provides an output to the marking station 114 for marking the test card in a manner as above described to indicate wrong answers thereon, to indicate the correct answer for each problem answered incorrectly, and to provide a total score printout, as desired.

The system 126 further provides an input to a typewriter input interface system 128. The interface system 128 further has applied thereto the shift pulses from the shift pulse generator 116 and the answer response outputs from the shift register 122. The output of interface system 128 is applied to a typewriter 70' which may comprise an electrically, coded control typewriter such as shown in FIG. 2.

Output control signals from the typewriter input interface system 128 effect the controlled print out of the typewriter 70' to produce the record sheet 71 as shown in FIG. 3. In this operation, each shift pulse causes the typewriter carriage to advance such that for each print out operation of the typewriter, the print out is performed on the record sheet 71 at the appropriate problem column or score column. Since the answer responses are applied to the interface system 128 from the shift register 122, and depending upon the correctness of the answer responses in accordance with the output of the logic system 126, in turn responsive to the outputs of the comparison circuit 124, the interface system 128 may cause the typewriter 70' to print out the answer response given where that response is incorrect. Similarly, the logic system 126 may control the interface system 128 to provide for print out of a letter, such as M, to represent multiple answer responses and to print out a total score indication in the appropriate column of record sheet 71, as described.

As previously noted, the typewriter 70' may also be employed as a system control input. The output of typewriter 70' is shown applied to a typewriter output interface system 130 which in turn is applied to a system control 132. The outputs of the system control 132 are merely illustratively indicated and represent the provision of suitable control inputs to the above-discussed operating portions of the system. For example these outputs may control the actuation of the transport system 110 and energization of the sensing and information processing portions of the grading and scoring apparatus.

A detailed explanation of an output recording system performing generally in accordance with the above-described system is provided in U.S. application Ser. No. 739,257, entitled "Output Recording System", of Leo L. Azure, Jr., filed June 24, 1968, now U.S. Pat. No. 3,550,290, and assigned to the assignee of the present invention.

Figure 5:
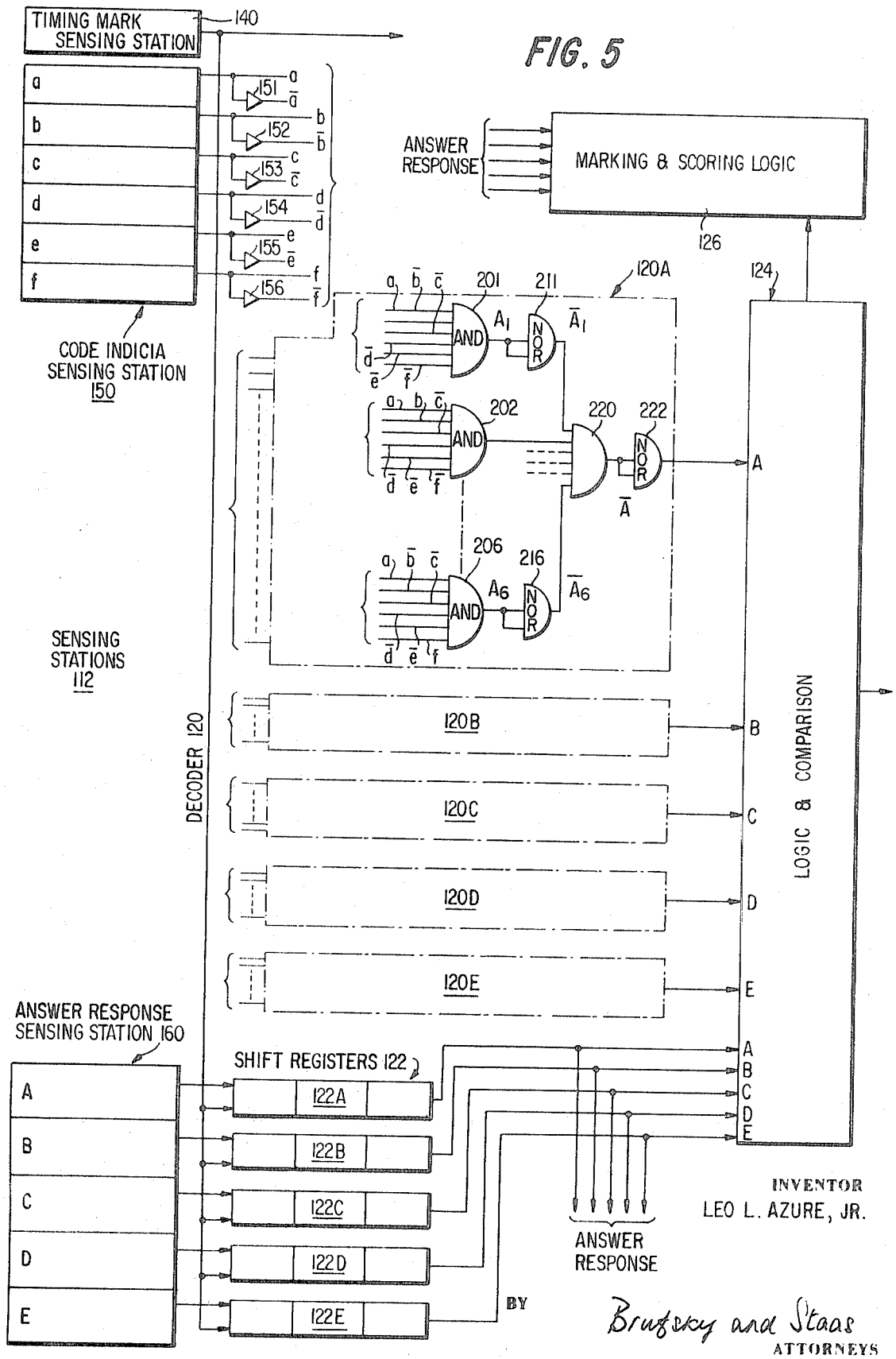
FIG. 5 is a schematic, partly in block diagram form, of the decoding logic and related portions of the system of the invention.

In FIG. 5 is shown a schematic of the decoder 120 shown generally in FIG. 4 and related components of the system of the invention, particularly including the sensing station 112, the shift register 122, the logic and comparison circuits 124 and the marking and scoring logic system 126. In FIG. 5, it is assumed that a column of timing marks is provided on the test card, and is sensed for providing the shift pulses. The modification of the system of FIG. 5 to respond to the sensed code indicia for the generation of shift pulses is obvious and therefore not shown or described.

The sensing station 112 includes a single channel-timing mark-sensing station 140, a plural channel of bit indicia sensing station 150, and a plural channel answer response indicia sensing station 160. Particularly, the station 150 includes a plurality of sensing channels $a$ through $f$, respectively corresponding to the columns of bit positions $a$ through $f$ the code portions 20 of the card 10. The outputs of the channels $a$ through $f$ are applied to inverters 151 through 156, respectively, for providing, in accordance with standard logic notation, the set of outputs $\bar{a}$ through $\bar{f}$ and the set of outputs $a$ through $f$. The station 160 includes a plurality of channels A through E corresponding to the answer indication area columns A through E. The various channels of the stations 150 and 160 are aligned in a row in spaced positions corresponding to the spacing of the various, corresponding columns of bit positions and answer indication areas on the test card 10 for sensing indicia therein as the card is transported past the sensing station 112, as diagrammatically shown in FIG. 4.

As discussed previously, a six-bit position code provides a total of 64 permutations. With five answer indication areas, and thus five multiple choice answer responses available for each problem, there is thereby provided a total of 12 code bit permutations for identification of each answer indication area. There remain four unused code bit permutations which may be employed as the dummy code indicia in the rows $x$, $y$, and $z$ shown in FIG. 1 on the test card 10. These dummy permutations are therefore not interpreted as defining any correct answer. Depending on the complexity of the code felt necessary to assure avoidance of code deciphering, any number of permutations from 1 to 12 may be provided for identification of each answer indication area A through E as a correct answer. The selection of the number of permutations is in part an economic consideration, in that the number of permutations employed determines the number of logic circuits required for decoding.

In FIG. 5, the decoder 120 includes a plurality of channels 120A through 120E which respectively effect decoding of the sensed code bit indicia each in accordance with a predetermined code bit permutation to produce outputs identifying the correct answer to a given problem as the answer indication areas A through E, respectively. Since each of the decode logic circuits 120A through 120E is identical in construction, although performing the decode logic function in accordance with a different code bit permutation, only the decode channel 120A is shown in detail.

The decode logic channel 120A includes a plurality of AND gates such as 201, 202, ... 206 each having six input terminals respectively connected to selected ones of the outputs of the six code indicia sensing channel $a$ through $f$ of station 150. The necessary connections are readily apparent from the labelling of the sensing station output terminals and that of the AND gates of the decoding channel, and the connections have therefore been merely diagrammatically indicated by brackets. The channel 120A includes six AND-gates 201 through 206 providing for a maximum of six code bit permutations for identification of answer indication area A as the correct answer for a given problem. Of these six AND gates, only the AND-gates 201, 202, and 206 are shown. Any fewer number or any greater number, to a total of 12 such AND gates may be employed, in accordance with the above discussion of possible code bit permutations for identification of a given answer indication area.

The decoding operation will be apparent with reference to the logic notation symbols associated with the inputs to the AND gates, such as AND-gate 201. In accordance with conventional logic notation, the absence or presence of a bar over a symbol identifies opposite states such as the existence or nonexistence of a given condition. Thus, $a$ represents the presence, and thus sensing, of a code bit indicia $a$, and $\bar{a}$ represents the absence of a code bit indicia $a$. Thus, with respect to AND-gate 201, a true output A1 indicating the decoding of the first of six code permutations corresponding to identification of A as a correct answer is produced when the input conditions $a$ and $\bar{b}, \bar{c}, \bar{d}, \bar{e},$ and $\bar{f}$ are true and thus when a code bit indicia in the bit position of column $a$ has been sensed but no bit positions $b$ through $f$ have been sensed in a given row of the test card 10. Similarly, it will be seen that A2 is true at the output of AND-gate 202 when code bit indicia are sensed in bit positions $a$ and $b$ and not in positions $c$ through $f$. Likewise, a true output A6 is produced by AND-gate 206 when code bit indicia are sensed in bit positions $a$ and $f$ but not in bit positions $b$ through $e$ in a given row. The outputs of AND-gates 201 through 206 are applied to corresponding NOR-gates 211 through 216 which satisfy a logic function for controlling AND-gate 220, such that the latter responds to a true condition for any of the outputs A1 through A6 to produce a true output A indicating that the sensed and decoded code bit indicia in a given group or row thereof identifies the answer indication area A as the correct answer for the problem associated with that code bit position row.

Under a normal condition, and prior to sensing of any code bit indicia, or of any permutation of code bit indicia specifically identifying A as a correct answer, each of the AND-gates 201 through 206 receives at least one false input and thus produces a false output A1 to A6, correctly corresponding to the stated condition. Respectively associated NOR-gates 211 through 216 effectively invert the false state of the logic conditions A1 through A6 to produce a state of the converse logic conditions $\overline{A1}$ through $\overline{A6}$ to the AND-gate 220. AND-gate 220 thereby is enabled to produce a true output $\overline{A}$ which in turn is inverted by the associated NOR-gate 222 to produce a false output A to the logic and comparison circuits 124. By contrast, when any one of the code bit permutations identifying A as the correct answer is sensed, the corresponding one of the AND-gates 201 to 206 is enabled and the associated one of the outputs A1 through A6 thereof is true. The corresponding one of the NOR gate outputs $\overline{A1}$ through $\overline{A6}$ is thereby false. AND-gate 220 is thus disabled producing a false output $\overline{A}$. NOR-gate 222 inverts the false output $\overline{A}$ to produce a true output A, thereby identifying the predetermined answer indication area A as corresponding to a correct answer to the problem associated with the bit position row then being sensed. In a similar manner, each of the decoder channels 120B through 120E produces a true output B through E, respectively, when the row of bit position indicia then being sensed identifies that answer indication area as corresponding to the predetermined correct answer for a given, respectively associated problem.

The outputs of the channels 160A through 160E of the answer response sensing station 160 are applied as inputs to a first stage of the respectively corresponding shift registers 122A through 122E. Detection of an answer in any one of the corresponding columns A through E of a given row of answer indication areas results in setting the first stage of the corresponding shift register. With concurrent reference to the test card 10 of FIG. 1, and as above discussed, due to the transport of the test card through the sensing station 112 with the top edge leading, it will be appreciated that a first shift pulse is applied to the shift registers 122A through 122E upon detection of the first timing mark 30, and thus preceding sensing of the first row of answer indication areas corresponding to problem 1. The first stage of the shift registers is thus cleared for receiving information. Since the code of row $x$ is a dummy code, no decoded correct answer is applied by the decoder 120 to the comparison circuit 124. Answer indicia A is then detected for problem 1, setting the first stage of the shift register 122A, the first stages of the remaining shift registers remaining unset, or cleared. Upon detection of the next successive timing mark, associated with code row $y$, the detected answer indicia stored in the first stage of the shift register 122A is advanced to the second stage thereof and the second stages of the remaining shift registers receive only the cleared state of the first stage. The first stages of all registers are thus prepared for setting in accordance with the detection of answer indicia from the row of areas corresponding to problem 2. The sequential advancement of detected answer indicia through the shift register stages proceeds in this manner in response to the successive detection of answer indicia in the succeeding rows.

It is apparent, for example, following detection of the second row of answer indicia, and of the timing mark associated with dummy row $z$, that the detected answer indicia A for problem 1 is presented at the output stage of the shift register 122A and thus is applied to the comparison circuit 124. Shortly thereafter, the sensing station 150 senses the row 1$a$ of code bit indicia, and substantially simultaneously therewith, the decoder 120A decodes the code bit permutation represented by the thus sensed indicia and presents the thus identified correct answer A for problem 1 to logic and comparison circuits 124. The circuits 124 then perform the grading function as above described by comparison of the answer response A for problem 1 with the correct answer A as identified, or represented, by the code bit permutation to produce a right answer output to the marking and scoring logic system 126. The operation as to presenting wrong or multiple answer outputs, as described previously with regard to FIG. 4, is apparent. The answer response detected for each problem thus is available at the output of shift register 122 and is applied to the system 126 for the recording purposes as similarly hereinbefore described. The decoding and grading operation proceeds in this manner for sequentially grading all answer responses indicated on the test card by comparison thereof with the corresponding decoded correct answers.

Each individual test card thus provides for automatic, self-programming of the test grading and scoring apparatus for effecting the grading and scoring operations as to that individual card and for all cards in succession. Cards having the same or different code bit permutations thus may be presented in any random sequence for grading and scoring. As noted above, different sets of cards having different code bit permutations for identifying nevertheless the identical sequence or set, of correct answers for the numbered problems may be provided, as well as different sets of cards having different code bit permutations for identifying a different set of answers to the numbered problems. As also noted, an suitable form of recording of the coded correct answer information on each test card may be employed, as desired, which is adapted for sensing and decoding by the apparatus of the invention to provide for the scoring and grading operations.

What is claimed is:

1. A method for testing with problems of the multiple choice type and for automatically grading and scoring answer responses to the problems, comprising the steps of:
    providing on a test card a code comprising a plurality of bit positions arranged in groups on the card and respectively corresponding to the problems and identifying predetermined correct answers for the test problems,
    employing the test card for receiving indicia representing the answer choices selected as the answer responses for the test problems,
    sensing the correct answer code and the answer choice indicia provided on each test card,
    decoding the correct answer code to identify the predetermined correct answers for the problems, and
    comparing the predetermined correct answers with the corresponding answer choice indicia for grading the answer responses to the test problems.

2. A method as recited in claim 1 further comprising:
    providing on each test card different code representations for identifying the same answer indication area of different groups thereof as the correct answer for the corresponding, different problems.

3. A method as recited in claim 1 further comprising the step of:
    providing different sets of test cards for different, respectively associated tests,
    providing on each of the test cards of a given set a given arrangement of code representations for identifying the same answer choice as the correct answer response for the corresponding, different problems.

4. A method as recited in claim 1 further comprising:
    providing different sets of test cards for different, respectively associated tests,
    providing on each of the test cards of a given set, a given arrangement of code representations for identifying the correct answers to the test problems, and
    providing on each of the test cards of each other set, a different arrangement of code representations for identifying the correct answers to the problems of that other, associated test.

5. A method as recited in claim 1 further comprising:
    providing different sets of test cards, for a given test,
    providing on each of the test cards of a given set a first arrangement of code representations for identifying the correct answers for that given test, and
    providing on each of the test cards of each other set, a different arrangement of code representations for identifying the same predetermined correct answers to the problems of that same, given test.

6. A method as recited in claim 1 further comprising the steps of:
    providing on each test card, groups of answer indication areas corresponding to the multiple choice answers for a plurality of test problems,
    employing the test card for receiving in said groups of answer indication areas thereof indicia representing selected answer choices as the answer response for the corresponding test problems, and
    providing on each test card a correct answer code including a plurality of code representations respectively related to said groups of answer indication areas for identifying the answer indication areas representing the predetermined correct answers for the corresponding problems.

7. A method as recited in claim 6 wherein the code representation on each test card comprises a plural bit position code having a number of code bit permutations exceeding the number of answer indication areas in a given group thereof, further comprising, providing groups of different code bit permutations for identifying the same answer indication area of different groups thereof as the correct answer for the corresponding, different problems.

8. A method as recited in claim 7 further comprising the steps of:
    providing different sets of test cards for different respectively associated tests,
    providing on each of the test cards of a answer indication areas in succession set, a given arrangement of groups of code bit permutations for identifying the answer choice indication areas corresponding to the predetermined correct answers for the given, associated test, and
    providing on each of the test cards of each other, different set, a different arrangement of groups of code bit permutations for identifying the answer choice indication areas corresponding to the predetermined correct answers for that other, associated test.

9. A method as recited in claim 7 further comprising the steps of:
    providing different sets of test cards for a given test,
    providing on each of the test cards of a given set a given arrangement of groups of code bit permutations for identifying the answer choice indication areas corresponding to the predetermined correct answers for that given test, and
    providing on each of the test cards of each other, different set, a different arrangement of groups of code bit permutations for identifying those same answer choice indication areas corresponding to the predetermined correct answers for that same, given test.

10. A method as recited in claim 7 further comprising providing the code representation on each test card as visible code bit indicia in the code bit positions of the groups thereof in accordance with the preselected code bit permutations.

11. A system for grading and scoring answers to problems of the multiple choice type employing a test card for receiving indicia representing answer responses to the problems and having a code comprising a plurality of bit positions arranged in groups on the card and respectively corresponding to the problems and identifying the predetermined correct answers for the problems, comprising:
    a sensing station including first means for sensing answer response indicia on each test card and second means for sensing the correct answer code on each test card,
    means responsive to said second means for decoding the sensed, correct answer code to identifying the correct answer for each test problem on the test card, and
    comparison means responsive to said first sensing means and to said decoding means for comparing the answer responses sensed by said first means from said answer choice indicia with the correct answers identified by said decoding means for grading the answer responses to the problems.

12. A system as recited in claim 11 wherein different code representations identify the same answer indication area as the predetermined correct answer, and wherein:
    said decoding means includes a plurality of decoding channels, respectively identifying a given answer choice indication area as a correct answer, and each of said channels is responsive to a number of different code representations sensed from a test card for identifying a respectively associated answer choice indication area as a correct answer.

13. A system as recited in claim 11 wherein each test card includes a plurality of groups of answer indication areas, corresponding to the multiple choice answers for a plurality of problems, for receiving indicia representing the answer choices to the problems and a correct answer code comprising a plural bit position code arranged in groups of bit positions respectively corresponding to the groups of answer indication areas for receiving indicia in the groups of code bit positions in accordance with the preselected code bit permutations identifying the correct answer choices for the corresponding groups of answer indication areas, and wherein:

said first sensing means includes a plurality of channels corresponding to the answer indication areas of said groups thereof for sensing answer indicia in the respectively corresponding answer indication areas, in succession for the plurality of groups of answer indications areas, said second sensing means includes a plurality of sensing channels respectively corresponding to said code bit positions for selectively sensing indicia in the respectively corresponding bit positions, in succession for the plurality of groups of code bit positions, said decoding means includes a plurality of decoding channels respectively identifying a given answer choice indication area of each of said groups thereof as a correct answer, and said plurality of decoding channels simultaneously receive the sensed code bit indicia output of said second sensing means for each of the successively sensed groups of code bit positions and respond to respectively associated, preselected code bit permutations represented by said sensed code bit indicia in each of said groups thereof to identify the respectively associated answer indication area as the correct answer.

14. A system as recited in claim 13 wherein the corresponding groups of answer indication areas and code bit positions are displaced on said test card and wherein:

said answer indicia sensing means senses the groups of answer indication areas in succession for the plurality of groups thereof, said code bit indicia sensing means senses the groups of code bit positions in succession for the plurality of groups thereof in synchronism with and a predetermined time interval after the sensing of the corresponding groups of answer indications areas, said answer indicia sensing means includes means for successively storing the answer responses from the groups of sensed answer choice indicia for the predetermined time interval and for presenting the answer responses to said comparison means following said predetermined time interval of storage thereof, and said decoding means substantially instantaneously decodes the correct answers upon sensing of the code bit indicia by said code-sensing means for simultaneously presenting said answer responses and said correct answers to said comparison means for grading the answer responses to the problems, for all problems in succession.

15. A system as recited in claim 11 wherein there is further provided:

system control means and output recording means, said system control means automatically initiating the grading and scoring of answer responses indicated on each test card, and said output recording means responding to said comparison means for providing a permanent record of the results of grading each of the answer responses on each test card, for all test cards in succession.

16. A system as recited in claim 15 wherein:

said system control means includes means for entering on said permanent record an identification of each test card prior to the scoring and grading of that test card, for all test cards in succession.

17. A system as recited in claim 11 wherein, for different problems in a given test having as the predetermined correct answers thereto the same answer choices indication areas there are provided on a test card for use with that test different code representations for identifying that same answer choice as the predetermined correct answer for each of those different problems, and wherein:

said decoding means includes a plurality of decoding channels, respectively identifying a given answer choice indication area as a correct answer, and each of said channels is responsive to a number of different preselected code bit permutations sensed from a test card for identifying the respectively associated answer choice indication areas as a correct answer.

18. A system as recited in claim 17 wherein the code for each correct answer is provided on each test card in accordance with the application of code bit indicia to selected ones of a predetermined number of code bit positions, and wherein:

said code bit indicia sensing means includes a plurality of bit position sensing means respectively corresponding to each of said code bit positions for selectively sensing indicia in the respectively corresponding bit position, each of said decoding channels includes a plurality of decoding logic circuits for decoding respectively associated ones of the preselected code bit permutations represented by the sensed code bit position indicia and corresponding to the answer choice indication area identified by that channel, and each of said decoding logic circuits includes a plurality of inputs respectively associated with said plurality of code bit position sensing means for responding to the sensing of code bit indicia in the respectively corresponding code bit positions for identifying the correct answer associated with that channel when the sensed code bit indicia correspond to the preselected code bit permutation associated with that logic circuit.

19. In a system for automatically grading answers to a plurality of problems of the multiple choice type wherein answer responses to the problems are represented by indicia applied to a test card and having a sensing station to sense the answer response indicia, means for sensing and decoding a correct answer code for identifying the correct answers for the problems and comparison means for comparing the answer responses sensed from the answer response indicia with the corresponding correct answers decoded from the correct answer code for grading the answer responses to each problem, the improvement comprising:

a test card for receiving answer choice indicia for indicating answer responses to each of the problems of a test, and said test card further having a code comprising a plurality of bit positions arranged in groups on the card and respectively corresponding to the problems and identifying predetermined correct answers for the test problems.

20. In a system as recited in claim 19, the improvement in test cards further comprising:

a plurality of groups of answer indications on the test card, corresponding to the multiple choice answers for each of a plurality of problems, for receiving answer indicia identifying the selected answer choices to the problems, and a plurality of groups of code bit positions on the test card respectively corresponding to the groups of answer indication areas for receiving code bit indicia in accordance with the different preselected code bit permutations for identifying different ones of the answer indication areas of the respectively corresponding groups thereof as the predetermined correct answers for the corresponding problems.

21. In a system as recited in claim 20, the improvement in test cards further comprising:

groups of code bit indicia on said test card comprising different preselected code bit permutations for identifying the same answer indication area of the respectively corresponding groups of answer indication areas as the predetermined correct answer for the corresponding problems.

22. In a system as recited in claim 21, the improvement in test cards further comprising:
different sets of test cards for use with corresponding, identical sets of problems, and
different arrangements of code bit permutations on the different sets of test cards for identifying the predetermined correct answers for the corresponding, identical sets of problems.

23. A system as recited in claim 21, the improvement in test cards further comprising:
plural sets of test cards for use with corresponding, plural sets of problems,
a given set of test cards for use with a given, corresponding set of problems having a first arrangement of code bit permutations thereon for identifying the predetermined correct answers to the corresponding set of problems, and
each other, different set of test cards having a different arrangement of code bit permutations thereon for identifying the predetermined correct answers for the corresponding, different set of problems.

24. A system as recited in claim 21, the improvement in test cards further comprising:
different sets of test cards for use with an identical set of problems,
a given set of test cards having a first arrangement of code bit permutations thereon for identifying predetermined correct answers for the given set of problems, and
each other, different set of test cards having a different arrangement of code bit permutations thereon for identifying the predetermined correct answers for that same, given set of problems.

* * * * *